United States Patent
Uchiyama et al.

[11] Patent Number: 5,880,824
[45] Date of Patent: Mar. 9, 1999

[54] OPTICAL FIBER STRAIN MEASURING APPARATUS

[75] Inventors: Haruyoshi Uchiyama; Zhixien Li; Yasushi Satoh, all of Tokyo; Toshio Kurashima, Mito, all of Japan

[73] Assignee: Ando Electric Co., Ltd., Tokyo, Japan

[21] Appl. No.: 924,325

[22] Filed: Sep. 5, 1997

[30] Foreign Application Priority Data

Sep. 13, 1996 [JP] Japan .................... 8-243760

[51] Int. Cl.$^6$ .................... G01N 21/00
[52] U.S. Cl. .................... 356/73.1
[58] Field of Search .................... 356/73.1

[56] References Cited

U.S. PATENT DOCUMENTS

| | | | |
|---|---|---|---|
| 5,619,320 | 4/1997 | Eiselt et al. | 356/73.1 |
| 5,619,321 | 4/1997 | Arliglia et al. | 356/73.1 |
| 5,729,368 | 3/1998 | Pugaczewski | 356/73.1 |

Primary Examiner—Frank G. Font
Assistant Examiner—Reginald A. Ratliff
Attorney, Agent, or Firm—Darby & Darby

[57] ABSTRACT

An object of the present invention is to provide an optical fiber strain measuring apparatus which can perform precise measurement without causing any fluctuation in signal level. To achieve the above object the present invention comprises: a polarization plane rotation device 105 which rotates a plane of polarization of an optical pulse; a photo-directional coupler 106 which projects an optical pulse projected from the polarization plane rotation device 105 into an optical fiber 107 to be measured, and projects out backscattering light produced in the optical fiber 107 to be measured; a polarization plane rotation device 160 which rotates a plane of polarization of a reference light; a light mixing device 109 for mixing the backscattering light projected out from the photo-directional coupler 106 and the reference light projected from the polarization plane rotation device 160; and a signal processing section 111 which detects the mixed light projected from the light mixing device 109, converts the detected light into an electrical signal and subjects the electrical signal to a predetermined operational processing to obtain a measurement waveform.

8 Claims, 3 Drawing Sheets

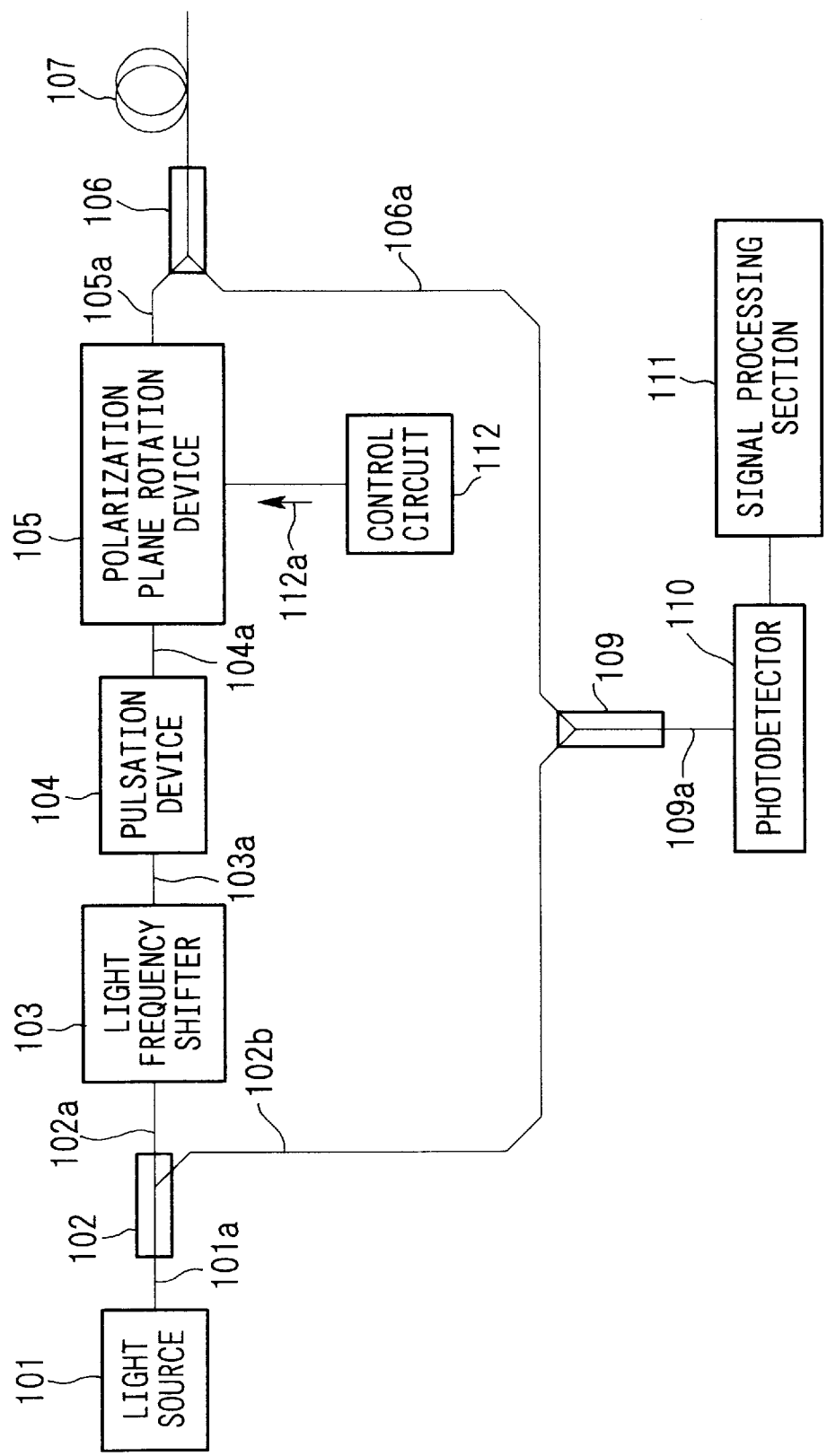

OPTICAL FIBER STRAIN MEASURING APPARATUS

BACKGROUND OF THE INVENTION

1. Field of the Invention

The present invention relates to an optical fiber strain measuring apparatus which measures strain of an optical fiber by heterodyne detection of mixed light comprising reference light and backscattering light from the optical fiber.

2. Description of the Related Art

An optical fiber strain measuring apparatus is an apparatus which, in general, projects an optical pulse from one end of an optical fiber to be measured, takes out backscattering light produced in the optical fiber from the end into which the optical pulse was projected, subjects mixed light of the taken out backscattering light and continuous light having a certain wavelength (reference light) to heterodyne detection using a photodetector, and measures a distorted position in the optical fiber from a relation between a time since the optical fiber was projected and a detected signal.

As described above, since the optical strain measuring apparatus measures a distorted position based on the detection result of mixed light comprising the taken out backscattering light and the reference light, it is required that the strength and the like of the reference light is stable uniformly in order to perform a precise measurement.

SUMMARY OF THE INVENTION

An object of the present invention is to provide an optical fiber strain measuring apparatus which can perform precise measurement without causing any fluctuation in signal level received by a photodetector, by fluctuating a state of polarization of the reference light at random.

In order to solve the problems described above, the present invention is characterized in comprising:

- a first polarization plane rotation device which rotates a plane of polarization of an optical pulse;
- a light coupling device which projects an optical pulse projected from the first polarization plane rotation device into an optical fiber to be measured, and projects out backscattering light from the optical fiber to be measured;
- a second polarization plane rotation device which rotates a plane of polarization of continuous light;
- a wave mixing device for mixing the backscattering light projected out from the light coupling device and the continuous light projected from the second polarization plane rotation device; and
- a detection operation device which detects the mixed light projected from the wave mixing device, converts the detected light into an electrical signal and subjects the electrical signal to a predetermined operational processing to obtain a measurement waveform.

With the present invention, since a plane of polarization of an optical pulse projected into the optical fiber to be measured and a plane of polarization of the reference light are rotated respectively, the signal level when the backscattering light and the reference light are mixed and detected fluctuates at random to alleviate the fluctuation of the signal level at the time of carrying out the operation. Therefore, any fluctuation in the polarization can be eliminated enabling precise measurement.

Furthermore, the present invention is characterized in comprising:

- a continuous light generating device for generating continuous light in which the light frequency is constant;
- a branch device for branching the continuous light into a signal light and a reference light;
- a conversion device for converting the signal light into an optical pulse;
- a first polarization plane rotation device which rotates a plane of polarization of the optical pulse;
- a light coupling device which projects an optical pulse projected from the first polarization plane rotation device into an optical fiber to be measured, and projects out backscattering light from the optical fiber to be measured;
- a second polarization plane rotation device which rotates a plane of polarization of the reference light;
- a wave mixing device for mixing the backscattering light projected out from the light coupling device and the reference light projected from the second polarization plane rotation device; and
- a detection operation device which detects the mixed light projected from the wave mixing device, converts the detected light into an electrical signal and subjects the electrical signal to a predetermined operational processing to obtain a measurement waveform.

Furthermore, the present invention is characterized in that a light frequency conversion device which changes the light frequency at a predetermined time cycle is provided between the branch device and the first polarization plane rotation device.

In addition, the present invention is characterized in that there is further provided a control device which independently controls the rotation angle in the first polarization plane rotation device and the second polarization plane rotation device.

In addition, preferably the first polarization plane rotation device comprises a Faraday rotation element.

Furthermore, preferably the second polarization plane rotation device comprises a Faraday rotation element.

Moreover, preferably the conversion device converts the signal light into an optical pulse having a time width of from 10 nsec to 1 $\mu$sec.

Furthermore, preferably the light frequency conversion device converts the light frequency into an optical pulse train which changes stepwise in a time series and has a time width of 2 $\mu$sec.

BRIEF DESCRIPTION OF THE DRAWING

FIG. 3 is a block diagram showing a structure of an optical fiber strain measuring apparatus upon which the present invention is based.

DESCRIPTION OF THE PREFERRED EMBODIMENT

Figure 1:
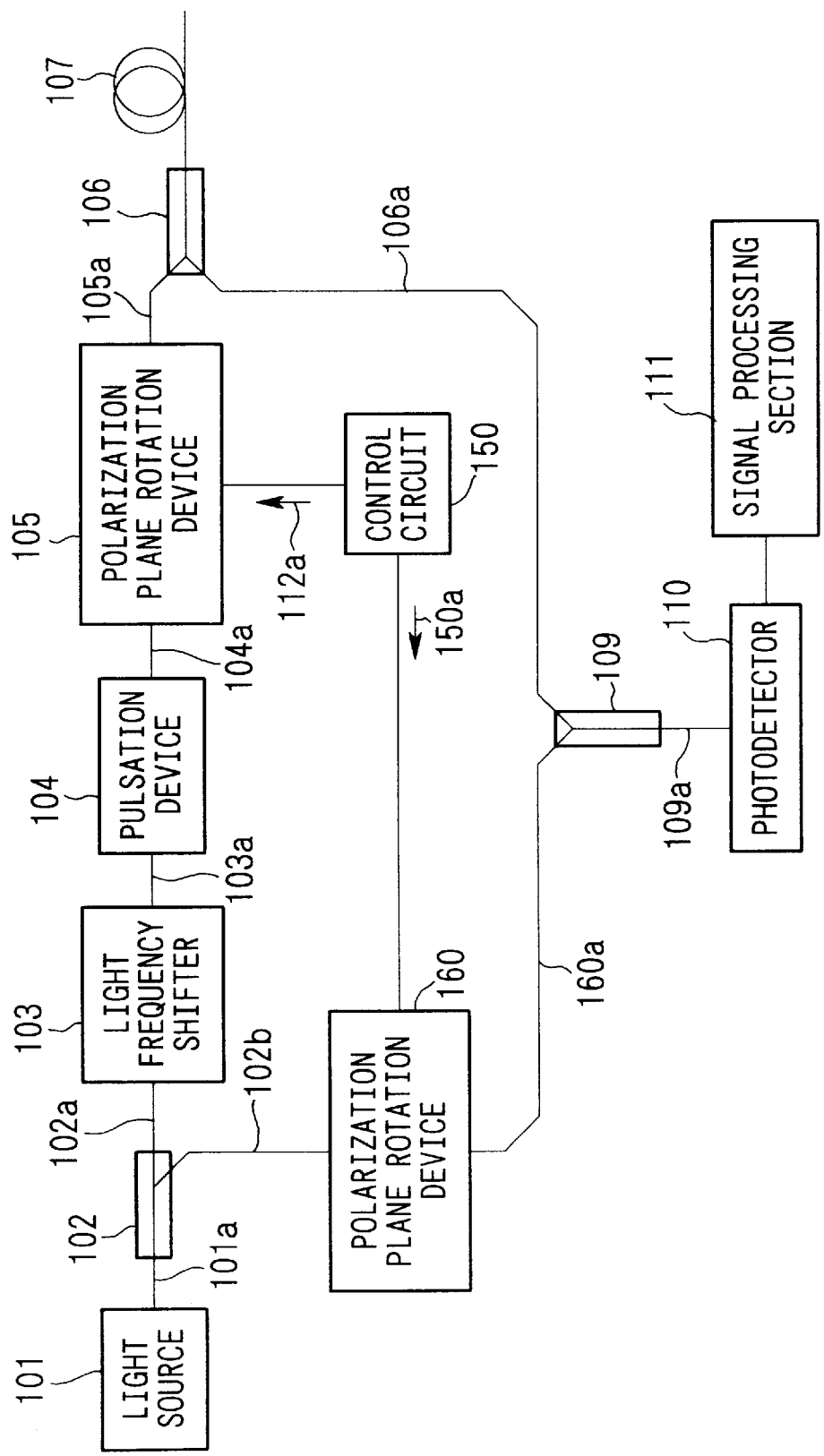
FIG. 1 is a block diagram showing a structure of an optical fiber strain measuring apparatus according to one embodiment of the present invention.

Before the present invention is described, an optical fiber strain apparatus which is the background of the present invention and on which the present invention is based will be described first.

FIG. 3 is a block diagram showing a structure of an optical fiber strain measuring apparatus which is the background of the present invention. Referring to FIG. 3, reference numeral 101 denotes a light source which projects continuous light having a single wavelength. Numeral 102 denotes a light branching device whose incoming end is connected to the light source 101 by an optical fiber 101a, and which branches continuous light projected from the light source 101 into two branched light beams with strength ratios of 1 to 1, to be projected respectively from two outgoing ends. One branched light beam projected from the light branching device 102 is referred to as a signal light, and the other branched light beam is referred to as a reference light.

Numeral 103 denotes a light frequency shifter, with an incoming end connected to the one outgoing end of the light branching device 102 by an optical fiber 102a. The light frequency shifter 103 changes the light frequency of the incoming signal light stepwise in a predetermined time cycle, and the time width is converted into an optical pulse train of about 2 $\mu$sec. Numeral 104 denotes a pulsation device with an incoming end thereof and an outgoing end of the light frequency shifter 103 connected by an optical fiber 103a. The pulsation device 104 converts the incoming optical pulse train into an optical pulse of from 10 nsec to 1 $\mu$sec. An outgoing end of the pulsation device 104 and an incoming end of a polarization plane rotation device 105 are connected by an optical fiber 104a.

The polarization plane rotation device 105 rotates a plane of polarization of the incoming light based on a drive current 112a output from a control circuit 112. This polarization plane rotation device 105 is, for example, a Faraday rotation element. The rotation angle of a plane of polarization in the Faraday rotation element depends upon the size of the magnetic field applied to the Faraday rotation element. Therefore, the plane of polarization can be rotated by changing the size of the magnetic field by using the drive current 112a output from the control circuit 112.

Numeral 106 denotes a photo-directional coupler having an incoming end, an incoming/outgoing end and an outgoing end, which projects the light entering from the incoming end out from the incoming/outgoing end, and projects the light entering from the incoming/outgoing end out from the outgoing end. The outgoing end of the polarization plane rotation device 105 and the incoming end of the photo-directional coupler 106 are connected by an optical fiber 105a. Furthermore, the light projected from the incoming/outgoing end of the photo-directional coupler 106 is projected into an optical fiber 107 to be measured.

Numeral 109 denotes a light mixing device having two incoming ends and one outgoing end, with one incoming end and the other outgoing end of the light branching device 102 connected by an optical fiber 102b, and the other incoming end thereof and the outgoing end of the photo-directional coupler 106 connected by an optical fiber 106a. That is, the backscattering light projected from the optical fiber and the reference light projected from the light branching device 102 are projected into the light mixing device 109, and the light mixing device 109 mixes these light beams.

The outgoing end of the light mixing device 109 and an incoming end of a photodetector 110 are connected by an optical fiber 109a. The photodetector 110 is for converting the incoming projected light into an electrical signal, and subjecting the incident light to heterodyne detection to output a detection signal. Numeral 111 denotes a signal processing section in which the input detection signal is A/D converted and an adding/averaging operation is performed to output a characteristic measurement waveform corresponding to the optical fiber 107 to be measured.

With the abovementioned structure, the continuous light projected from the light source 101 enters into the light branching device 102 and is branched into a signal light and a reference light. The signal light is projected into the light frequency shifter 103, and the light frequency thereof is changed stepwise in a time series, and converted into an optical pulse train having a time width of 2 $\mu$sec. The optical pulse train projected from the light frequency shifter 103 is projected into the pulsation device 104, and the time width thereof is converted into an optical pulse of from 10 nsec to 1 $\mu$sec. That is, an optical pulse having a desired light frequency is generated by means of the light frequency shifter 103 and the pulsation device 104. The optical pulse projected from the pulsation device 104 is subjected to rotation of a plane of polarization in the polarization plane rotation device 105, at a predetermined angle and in a predetermined time cycle, based on the drive current 112a output from the control circuit 112, and then passes through the photo-directional coupler 106 into the optical fiber 107 to be measured.

When the optical pulse is projected into the optical fiber 107 to be measured, it undergoes Rayleigh scattering and/or Brillouin scattering in the optical fiber 107 to be measured and backscattering light is generated. The backscattering light is projected into the other incoming end of the light mixing device 109 via the photo-directional coupler 106 and the optical fiber 106a. Furthermore, the reference light projected from the light branching device 102 is projected into the one incoming end of the light mixing device 109 and mixed with the backscattering light. The mixed light projected from the light mixing device 109 is projected into the photodetector 110 to be subjected to heterodyne detection, and a detection signal is output. The detection signal output from the photodetector 110 is input to the signal processing section 111, and A/D converted to perform the averaging/adding operation and the like. Thus, the measurement waveform can be obtained.

With the optical fiber strain measuring apparatus described above, the polarization plane rotation device 105 rotates the plane of polarization of the optical pulse at random, based on the drive current 112a output from the control circuit 112. When the plane of polarization of the optical pulse is constant, the backscattering light received by the photodetector 110 is always in the same state of polarization, and polarization fluctuation appears conspicuously in this signal level. That is, the plane of polarization of the optical pulse projected into the optical fiber 107 to be measured is rotated at random in order to prevent the measurement results from changing depending on the direction of the plane of polarization of the optical pulse.

However, when the optical fiber to be measured has a characteristic polarization dependence, that is, even if the projected plane of polarization of the optical pulse is random, it is changed to a particular polarization direction, then the backscattering light projected from the optical fiber 107 to be measured is polarized in a particular direction, irrespective of the extent of rotation of the projected plane of polarization of the optical pulse. Moreover, since the state of polarization of the mixed light received by the photodetector 110 is always the same, the polarization fluctuation of the signal level cannot be eliminated.

The fluctuation of the signal level cannot be improved only by the averaging/adding operation in the signal processing section. Therefore, there has been a problem in that the optical fiber to be measured cannot be precisely measured.

The object of the present invention therefore is to provide an optical fiber strain measuring apparatus which can perform precise measurement without causing fluctuations in the signal level received by the photodetector, by fluctuating the state of polarization of the reference light at random.

The optical fiber strain measuring apparatus according to one embodiment of the present invention will now be described with reference to the accompanying drawings.

FIG. 1 is a block diagram showing the structure of the optical fiber strain measuring apparatus according to one embodiment of the present invention. Parts the same those of the optical fiber strain measuring apparatus shown in FIG. 3, are denoted by the same reference numerals and description is omitted. The difference between the optical fiber strain measuring apparatus according to the one embodiment of the present invention shown in FIG. 1 and the optical fiber strain measuring apparatus shown in FIG. 3 is that a polarization plane rotation device 160 is provided between the light branching device 102 and the light mixing device 109, and that this polarization plane rotation device 160 is controlled by a control circuit 150.

In FIG. 1, reference numeral 101 denotes a light source (continuous light generating device), 102 denotes a light branching device (branch device), 103 denotes a light frequency shifter (light frequency conversion device), 104 denotes a pulsation device (conversion device), 105 denotes a polarization plane rotation device (first polarization plane rotation device), 106 denotes photo-directional coupler (light coupling device), 107 denotes an optical fiber to be measured, 109 denotes a light mixing device (wave mixing device), 110 denotes a photodetector, and 111 denotes a signal processing section (the photodetector 110 and the signal processing section 111 constitute a detection operation device). The polarization plane rotation device 160 is a polarization plane rotation device comprising, as with the polarization plane rotation device 105, a Faraday rotation element, which rotates a plane of polarization of the incoming light at a predetermined angle and in a predetermined time cycle based on a drive current 150a output from a control circuit 150.

With the abovementioned structure, continuous light projected from the light source 101 enters into the light branching device 102 and is branched into a signal light and a reference light. The signal light is projected into the light frequency shifter 103, and the light frequency thereof is changed stepwise in a time series, and converted into an optical pulse train having a time width of 2 μsec. The optical pulse train projected from the light frequency shifter 103 is projected into the pulsation device 104, and the time width thereof is converted into an optical pulse of from 10 nsec to 1 μsec. That is, an optical pulse having a desired light frequency is generated by means of the light frequency shifter 103 and the pulsation device 104. The optical pulse projected from the pulsation device 104 is subjected to rotation of a plane of polarization in the polarization plane rotation device 105, at a predetermined angle and in a predetermined time cycle, based on the drive current 112a output from the control circuit 150, and then passes through the photo-directional coupler 106 into the optical fiber 107 to be measured.

When the optical pulse is projected into the optical fiber 107 to be measured, it undergoes Rayleigh scattering and/or Brillouin scattering in the optical fiber 107 to be measured and backscattering light is generated. The backscattering light is projected into the other incoming end of the light mixing device 109 via the photo-directional coupler 106 and the optical fiber 106a.

The reference light projected from the light branching device 102 described above is projected into the polarization plane rotation device 160 via the optical fiber 102b, and the plane of polarization thereof is rotated based on the drive current 150a output from the control circuit 150.

Figure 2:
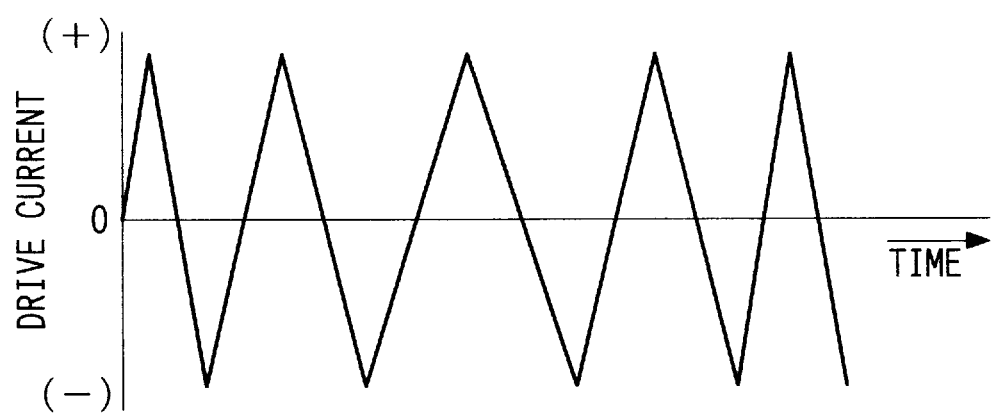
FIG. 2 is a diagram showing one example of a drive current 150a in FIG. 1.

The drive current 150a output from the control circuit 150 is a signal shown in FIG. 2. FIG. 2 is a diagram showing one example of the drive current 150a. In FIG. 2, "(+)" and "(−)" indicate the polarity of the drive current 150a. For example, when the polarity is (+), the plane of polarization of the reference light is rotated in the clockwise direction with respect to the direction of travel of the reference light, and when the polarity is (−), the plane of polarization of the reference light is rotated in the counterclockwise direction with respect to the direction of travel of the reference light. It is set up so that there is no correlation between the drive current 150a and the drive current 112a.

The reference light passed through the polarization plane rotation device 160 enters into the light mixing device 109 via the optical fiber 160a, and is mixed with the backscattering light described above. Since the plane of polarization of the optical pulse entering into the optical fiber 107 to be measured is made random by the polarization plane rotation device 105, then the backscattering light projected from the optical fiber 107 to be measured and entering into the light mixing device 109 is also in a random state of polarization. In addition, the reference light entering into the light mixing device 109 is also in a random state of polarization, since the plane of polarization thereof is rotated by the polarization plane rotation device 160.

The mixed light projected from the light mixing device 109 enters into the photodetector 110 and is subjected to heterodyne detection, and a detection signal is output from the photodetector 110. Since the signal level of the mixed light changes at random, the signal level of the detection signal also fluctuates at random. This detection signal is input to the signal processing section 111. Since the signal level of the detection signal to be input is subjected to the averaging/adding operation in the signal processing section 111 for a longer period of time than the time for fluctuating at random, the fluctuation of the signal level is alleviated. Hence, precise measurement can be effected.

What is claimed is:

1. An optical fiber strain measuring apparatus comprising:

first polarization plane rotation means which rotates a plane of polarization of an optical pulse;

light coupling means which projects an optical pulse projected from said first polarization plane rotation means into an optical fiber to be measured, and projects out backscattering light from said optical fiber to be measured;

second polarization plane rotation means which rotates a plane of polarization of continuous light;

wave mixing means for mixing the backscattering light projected out from said light coupling means and the continuous light projected from said second polarization plane rotation means; and detection operation means which detects the mixed light projected from said wave mixing means, converts the detected light into an electrical signal and subjects the electrical signal to a predetermined operational processing to obtain a measurement waveform.

2. An optical fiber strain measuring apparatus comprising:

continuous light generating means for generating continuous light in which the light frequency is constant;

branch means for branching said continuous light into a signal light and a reference light;

conversion means for converting said signal light into an optical pulse;

first polarization plane rotation means which rotates a plane of polarization of said optical pulse;

light coupling means which projects an optical pulse projected from said first polarization plane rotation means into an optical fiber to be measured, and projects out backscattering light from said optical fiber to be measured;

second polarization plane rotation means which rotates a plane of polarization of said reference light;

wave mixing means for mixing the backscattering light projected out from said light coupling means and the reference light projected from said second polarization plane rotation means; and detection operation means which detects the mixed light projected from said wave mixing means, converts the detected light into an electrical signal and subjects the electrical signal to a predetermined operational processing to obtain a measurement waveform.

3. An optical fiber strain measuring apparatus according to claim 2, wherein a light frequency conversion means which changes the light frequency at a predetermined time cycle is provided between said branch means and said first polarization plane rotation means.

4. An optical fiber strain measuring apparatus according to claim 2, wherein there is provided control means which independently controls the rotation angle in said first polarization plane rotation means and said second polarization plane rotation means.

5. An optical fiber strain measuring apparatus according to claim 2, wherein said first polarization plane rotation means comprises a Faraday rotation element.

6. An optical fiber strain measuring apparatus according to claim 2, wherein said second polarization plane rotation means comprises a Faraday rotation element.

7. An optical fiber strain measuring apparatus according to claim 2, wherein said conversion means converts said signal light into an optical pulse having a time width of from 10 nsec to 1 $\mu$sec.

8. An optical fiber strain measuring apparatus according to claim 3, wherein said light frequency conversion means converts the light frequency into an optical pulse train which changes stepwise in a time series and has a time width of 2 $\mu$sec.

* * * * *

UNITED STATES PATENT AND TRADEMARK OFFICE
CERTIFICATE OF CORRECTION

PATENT NO. : 5,880,824
DATED : March 9, 1999
INVENTOR(S) : Haruyoshi Uchiyama et al It is certified that error appears in the above-identified patent and that said Letters Patent is hereby corrected as shown below:

<u>Title page,</u>
Item [73], after "Ando Electric Co., Ltd., Tokyo, Japan," add -- ; Nippon Telegraph and Telephone Corporation, Tokyo, Japan --.

Signed and Sealed this

First Day of January, 2002

*Attest:*

JAMES E. ROGAN
*Attesting Officer*    *Director of the United States Patent and Trademark Office*